(12) United States Patent
Shirai

(10) Patent No.: US 9,282,233 B2
(45) Date of Patent: Mar. 8, 2016

(54) INFORMATION REGISTRATION SYSTEM, INFORMATION REGISTRATION METHOD, REGISTRATION APPARATUS, AND IMAGE PICKUP APPARATUS

(71) Applicant: CANON KABUSHIKI KAISHA, Tokyo (JP)

(72) Inventor: Kunihiro Shirai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/211,935

(22) Filed: Mar. 14, 2014

(65) Prior Publication Data

US 2014/0198225 A1    Jul. 17, 2014

Related U.S. Application Data

(60) Division of application No. 13/402,376, filed on Feb. 22, 2012, now abandoned, which is a continuation of application No. 12/511,409, filed on Jul. 29, 2009, now Pat. No. 8,248,509.

(30) Foreign Application Priority Data

Aug. 1, 2008    (JP) .................................. 2008-200079
Sep. 12, 2008   (JP) .................................. 2008-235734

(51) Int. Cl.
  *H04N 5/232*   (2006.01)
  *G03B 17/18*   (2006.01)

(52) U.S. Cl.
  CPC ............ *H04N 5/23209* (2013.01); *G03B 17/18* (2013.01); *H04N 5/23216* (2013.01); *H04N 5/23293* (2013.01)

(58) Field of Classification Search
  CPC .......... H04N 5/23209; H04N 5/23216; H04N 5/23293; G03B 17/18
  USPC ............................................... 348/222.1, 360
  See application file for complete search history.

(56) References Cited

U.S. PATENT DOCUMENTS

2008/0199168 A1*  8/2008  Sakaguchi ...................... 396/91
2009/0161002 A1*  6/2009  Goh et al. ...................... 348/360

* cited by examiner

*Primary Examiner* — Gevell Selby
(74) *Attorney, Agent, or Firm* — Cowan, Liebowitz & Latman, P.C.

(57) ABSTRACT

A registration apparatus obtains, from an image pickup apparatus, identification information set in a lens apparatus that is attached to the image pickup apparatus. The registration apparatus pre-stores lens information including information that identifies the models of lens apparatuses and corresponding correction information, such that the lens information can be referenced by identification information. The registration apparatus displays a list of the stored lens apparatus models in a confirmation window such that the models of lens apparatuses corresponding to obtained identification information can be distinguished from the models of other lens apparatuses.

14 Claims, 11 Drawing Sheets

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

INFORMATION REGISTRATION SYSTEM, INFORMATION REGISTRATION METHOD, REGISTRATION APPARATUS, AND IMAGE PICKUP APPARATUS

CROSS-REFERENCE TO RELATED APPLICATION

This application is a divisional of application Ser. No. 13/402,376, filed Feb. 22, 2012; which is a continuation of application Ser. No. 12/511,409, filed Jul. 29, 2009, now U.S. Pat. No. 8,248,509, the entire disclosures of which are hereby incorporated by reference.

BACKGROUND OF THE INVENTION

1. Field of the Invention

The present invention relates to an information registration system for registering correction information of a removable lens apparatus in an image pickup apparatus, as well as an information registration method, a registration apparatus, and an image pickup apparatus.

2. Description of the Related Art

In recent years, in some image pickup apparatuses such as digital still cameras to/from which a lens apparatus can be attached/removed, it has been possible to store correction information for lens apparatuses in a memory, read correction information corresponding to the attached lens apparatus from the memory, and correct a picked-up image. With such image pickup apparatuses, it is necessary to pre-store, in the memory, correction information for lens apparatuses that are to be attached and used.

Image pickup apparatuses themselves have become diverse, and particularly with entry models, there are cases in which the memory capacity and processing capability are not very high due to price reduction. It is therefore possible for part of the correction information to not be used (i.e., some correction processing is not executed).

Japanese Patent Laid-Open No. 2006-267770 discloses technology relating to an image pickup apparatus that obtains, from a lens apparatus attached to the image pickup apparatus, unique information that identifies the lens apparatus, obtains optical characteristics information for the lens that corresponds to the obtained unique information via a computer network, and stores the optical characteristics information in a memory.

However, in the above conventional technology, the lens information that is stored in a memory of the image pickup apparatus has been automatically selected based on the unique information of the lens apparatus that is attached to the image pickup apparatus. Therefore, a user has not been able to visually confirm which lens apparatus's correction information, from a list of lens apparatuses that can be registered in the image pickup apparatus from a registration apparatus, will be stored in the memory of the image pickup apparatus.

Also, in the above conventional technology, even if the image pickup apparatus does not use part of the correction information, all of the correction information is stored in the memory of the image pickup apparatus. It is therefore possible for memory space to be wasted by unnecessary correction information that is not actually used.

SUMMARY OF THE INVENTION

The present invention has been achieved in light of the above situation. A characteristic feature of the present invention is that, in the case of registering correction information of a lens apparatus in an image pickup apparatus, a user can visually confirm which lens apparatus's correction information, from a list of lens apparatuses that can be registered in the image pickup apparatus from a registration apparatus, is to be registered. Another characteristic feature of the present invention is preventing unnecessary correction information that is not used by the image pickup apparatus from being stored in the memory of the image pickup apparatus.

According to an aspect of the present invention, there is provided an information registration system including an image pickup apparatus to/from which a lens apparatus having identification information set therein can be attached/removed, and a registration apparatus for registering correction information of a lens apparatus in the image pickup apparatus by connecting to and communicating with the image pickup apparatus, the registration apparatus comprising: a lens information storage unit that stores lens information so as to be able to be referenced by identification information, the lens information including information that identifies the model of a lens apparatus and correction information that corresponds thereto; an obtaining unit that obtains, from the image pickup apparatus, identification information that is set in a lens apparatus that is attached to the image pickup apparatus; a display unit that displays a confirmation window that displays a list of models of lens apparatuses whose lens information is stored in the lens information storage unit, such that the model of the lens apparatus corresponding to the identification information obtained by the obtaining unit can be distinguished from the model of another lens apparatus; an operation unit that receives, from a user via the confirmation window, a designation of the model of a lens apparatus whose correction information is to be registered in the image pickup apparatus; and a transmission unit that transmits, from the lens information storage unit to the image pickup apparatus, registration information that includes identification information and correction information of the lens apparatus whose designation was received by the operation unit, and the image pickup apparatus comprising: a correction information storage unit that stores correction information of a lens apparatus; a reply unit that transmits the identification information set in the attached lens apparatus to the registration apparatus in accordance with a request from the registration apparatus; a receiving unit that receives the registration information transmitted from the registration apparatus; and an update unit that updates storage content of the correction information storage unit based on the registration information received by the receiving unit.

According to an aspect of the present invention, there is provided an information registration method performed by (i) an image pickup apparatus to/from which a lens apparatus having identification information set therein can be attached/removed, and that has a correction information storage unit that stores correction information of a lens apparatus, and (ii) a registration apparatus for registering correction information of a lens apparatus in the image pickup apparatus by connecting to and communicating with the image pickup apparatus, the registration apparatus having an operation unit, a display unit, and a lens information storage unit that stores lens information so as to be able to be referenced by identification information, the lens information including information that identifies the model of a lens apparatus and correction information that corresponds thereto, the information registration method comprising: an obtaining step of obtaining, from the image pickup apparatus by the registration apparatus, identification information that is set in a lens apparatus that is attached to the image pickup apparatus; a displaying step of displaying, on the display unit, a confirmation window that displays a list of models of lens apparatuses whose lens information is stored in the lens information storage unit, such that the model of the lens apparatus corresponding to the identification information obtained in the obtaining step can be distinguished from the model of another lens apparatus; an operating step of receiving, from a user by the operation unit via the confirmation window, a designation of the model of a lens apparatus whose correction information is to be registered in the image pickup apparatus; a transmitting step of transmitting by the registration apparatus, from the lens information storage unit to the image pickup apparatus, registration information that includes identification information and correction information of the lens apparatus whose designation was received in the operating step; a receiving step of receiving, by the image pickup apparatus, the registration information transmitted from the registration apparatus; and an updating step of updating, by the image pickup apparatus, storage content of the correction information storage unit based on the registration information received in the receiving step.

According to an aspect of the present invention, there is provided a registration apparatus for registering correction information of a lens apparatus in an image pickup apparatus to/from which a lens apparatus having identification information set therein can be attached/removed, by connecting to and communicating with the image pickup apparatus, the registration apparatus comprising: a lens information storage unit that stores lens information so as to be able to be referenced by identification information, the lens information including information that identifies the model of a lens apparatus and correction information that corresponds thereto; an obtaining unit that obtains, from the image pickup apparatus, identification information that is set in a lens apparatus that is attached to the image pickup apparatus; a display unit that displays a confirmation window that displays a list of models of lens apparatuses whose lens information is stored in the lens information storage unit, such that the model of the lens apparatus corresponding to the identification information obtained by the obtaining unit can be distinguished from the model of another lens apparatus; an operation unit that receives, from a user via the confirmation window, a designation of the model of a lens apparatus whose correction information is to be registered in the image pickup apparatus; and a transmission unit that transmits, from the lens information storage unit to the image pickup apparatus, registration information that includes identification information and correction information of the lens apparatus whose designation was received by the operation unit.

According to an aspect of the present invention, there is provided an image pickup apparatus to/from which a lens apparatus having identification information set therein can be attached/removed, and that communicably connects to a registration apparatus for registering correction information of a lens apparatus, the image pickup apparatus comprising: a correction information storage unit that stores correction information of a lens apparatus; a reply unit that transmits identification information set in an attached lens apparatus to the registration apparatus in accordance with a request from the registration apparatus; a receiving unit that receives registration information that has been transmitted from the registration apparatus and that includes the correction information and the identification information; and an update unit that updates storage content of the correction information storage unit based on the registration information received by the receiving unit.

Further features of the present invention will become apparent from the following description of exemplary embodiments with reference to the attached drawings.

DESCRIPTION OF THE EMBODIMENTS

Embodiments of the present invention are described below with reference to the drawings, but the present invention is not limited to the embodiments below. Also, these embodiments of the present invention are merely preferred embodiments of the present invention, and do not limit the scope of the present invention.

First Embodiment

Figure 1:
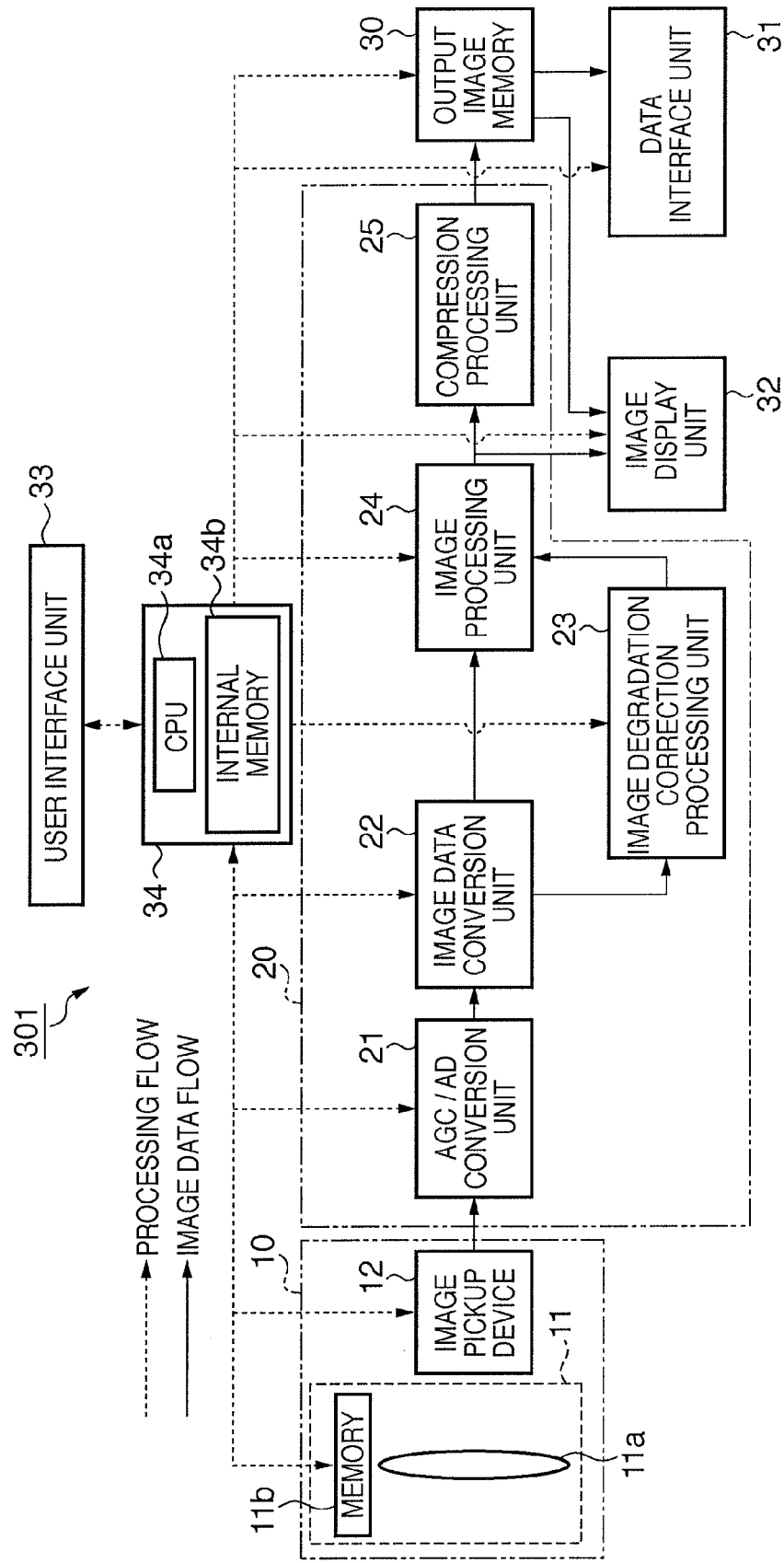
FIG. 1 is a block diagram showing a configuration of an image pickup apparatus according to a first embodiment of the present invention.

FIG. 1 is a block diagram showing a configuration of an image pickup apparatus 301 according to a first embodiment of the present invention. Note that the image pickup apparatus 301 described below is a so-called digital still camera (hereinafter, called a digital camera).

The image pickup apparatus 301 includes an image pickup unit 10, a data processing unit 20, an output image memory 30, a data interface unit 31, an image display unit 32, a user interface unit 33, and a central control unit 34. The image pickup unit 10 has a lens apparatus 11 and an image pickup device 12. The data processing unit 20 has an AGC/AD conversion unit 21, an image data conversion unit 22, an image degradation correction processing unit 23, an image processing unit 24, and a compression processing unit 25.

To describe the above configuration in more detail, the central control unit 34 has a CPU (Central Processing Unit) 34a and an internal memory 34b. The CPU 34a has the functions of performing overall management of the image pickup apparatus 301 and issuing processing instructions. In FIG. 1, broken-line arrows indicate the flow of processing, and solid-line arrows indicate the flow of image data.

The image pickup unit 10 is unit in which the lens apparatus 11 projects an image of an object onto the light receiving face of the image pickup device 12, thus picking up the image of the object. Specifically, when the shutter (not shown) of the image pickup apparatus 301 has been pressed, or when the image display unit 32 is used as a viewfinder, the image pickup unit 10 picks up an image of the object as described above in accordance with an instruction from the CPU 34a.

The lens apparatus 11 has an image pickup optical system 11a for forming an image of an object, and a memory 11b that has set therein unique identification information that enables identifying the type of the lens apparatus 11 and the lens apparatus 11 itself. The lens apparatus 11 has mechanisms for zooming, determining the focus position, and driving the aperture (not shown) in the image pickup optical system 11a, and has the functions of detecting the values of the zoom state, the focus position, and the aperture diameter during shooting via the CPU 34a. Also, the identification information stored in the memory 11b can be read by the central control unit 34 via a connection point (not shown) that electrically connects the lens apparatus 11 and the image pickup apparatus 301. Also, the lens apparatus 11 can be attached to and removed from the image pickup apparatus 301, and different lens apparatuses 11 can be attached to and removed from the image pickup apparatus 301. As a correction information storage means, the internal memory 34b stores optical characteristics correction data (correction information) such as the limb darkening and distortion aberration of the lens apparatus 11, and the magnification chromatic aberration and axial chromatic aberration.

The image pickup device 12 is a single photoelectric conversion device that converts an optical signal obtained from an image formed on the light receiving face into an electrical signal for each light receiving pixel that corresponds in position. The image pickup device 12 also has a function for performing color separation with use of R (red), G (green), and B (blue) filters that are arranged in the Bayer pattern shown in FIG. 2 in the pixels of a light receiving unit of the image pickup device 12. The exposure time and object image obtaining timing of the image pickup device during shooting is controlled by the CPU 34a, and image data obtained as an electrical signal is transferred to the data processing unit 20 in accordance with an instruction from the CPU 34a.

Upon being transferred to the data processing unit 20, the image signal is first transferred to the AGC/AD conversion unit 21. The AGC/AD conversion unit 21 performs AGC (Automatic Gain Control) to amplify and correct the intensity of the received image signal, performs AD conversion to convert the image signal into digital data, and transfers the digital data to the image data conversion unit 22. The image data conversion unit 22 then converts the received digital data into digital image (tone) data.

The digital image data resulting from the conversion performed by the image data conversion unit 22 is transferred to the image processing unit 24 after the image degradation correction processing unit 23 has performed image correction processing thereon, or without correction processing being performed. This branch in the processing occurs due to the existence of conditions such as whether or not the camera is set to perform correction, and whether or not correction data exists for the optical system used during shooting.

The image degradation correction processing unit 23 corrects image degradation in the picked-up image that has been picked up by the lens apparatus 11. In accordance with an instruction from the CPU 34a, and based on the optical characteristics correction data for the lens apparatus 11 that is stored in the internal memory 34b, the image degradation correction processing unit 23 corrects image degradation in the received image data that occurs due to the above-described optical characteristics of the lens apparatus 11. Specifically, a limb darkening characteristic, a magnification chromatic aberration characteristic, an axial chromatic aberration characteristic, a distortion aberration characteristic, and the like are corrected in accordance with the optical characteristics correction data. In this case, the data used in the image degradation correction processing performed by the image degradation correction processing unit 23 may be any data that is useful for correction, such as a lens design value, lens aberration data, and a lens aberration correction parameter.

Meanwhile, the image processing unit 24 performs image conversion processing based on data regarding color systems, such as color system conversion processing and luminance/color separation. Generally, such image conversion processing is performed based on the assumption that for an arbitrary pixel position, the object image formation position matches between the color systems. There are various methods of correcting the optical characteristics, and correction may be performed by any means.

The image data on which image degradation correction has been performed is transferred to the image processing unit 24, which performs various types of image processing such as luminance color separation processing, white balance adjustment, gray balance adjustment, density adjustment, color balance adjustment, and edge emphasizing.

The image data resulting from the image processing performed by the image processing unit 24 is transferred to the compression processing unit 25, which compresses the image data using a predetermined image compression processing method. The compression method may be any method of compressing image data, such as JPEG (Joint Photographic Expert Group), TIFF (Tag Image File Format), and JPEG2000. The compressed image data is transferred to the output image memory 30 as output image data, and stored therein.

The output image memory 30 that stores the output image data is a recording medium that can be mounted in and removed from the image pickup apparatus 301, and an output image can be directly transferred to another information terminal device via the recording medium. Also, the output image memory 30 is a re-writable memory, examples of which include a compact flash (registered trademark) memory, and card-shaped memories such as a smart media card, a memory stick, a PC card, or an ATA card. The output image memory 30 may be, for example, a general-purpose memory such as an MO disk, a floppy (registered trademark) disk, a ZIP disk, a CD-R, a CD-RW, or a DVD-ROM, and may take any form.

The data interface unit 31 is an interface for connecting to another information terminal device wirelessly or by wire so as to enable communication therebetween. Specifically, under the control of the central control unit 34, the data interface unit 31 performs data communication via USB communication, a LAN, the Internet, or the like. For example, the data interface unit 31 can transfer image data stored in the output image memory 30 to another information terminal device via wired transmission or wireless transmission.

The image display unit 32 is configured from a liquid crystal display or the like, and can display image data recorded in the output image memory 30, camera shooting settings, and the like. As an electronic viewfinder, the image display unit 32 can also display object images. The image display function of the image display unit 32 can be switched ON and OFF via the user interface unit 33, and display information can also be switched via the user interface unit 33.

Figures 2, 3:
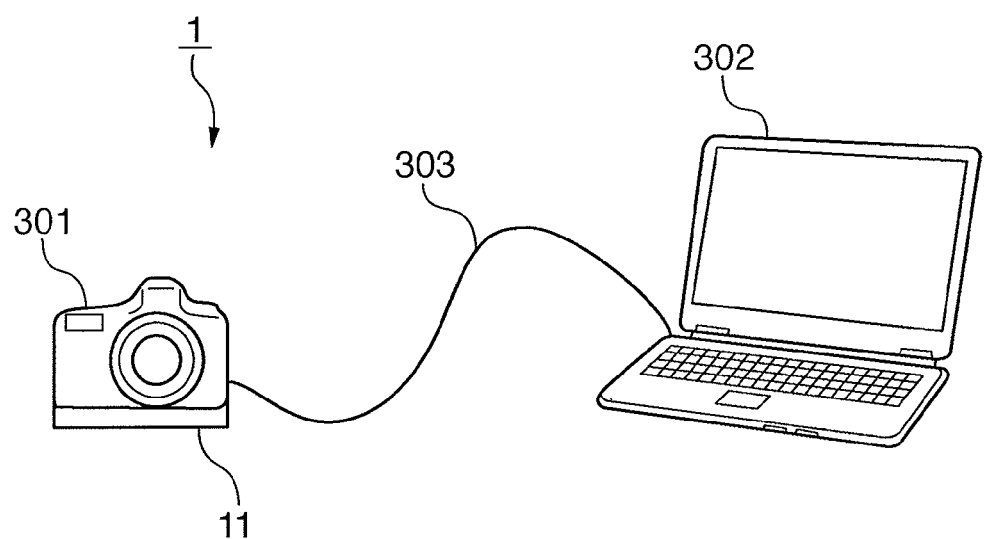
FIG. 2 is a conceptual diagram showing an array of an image pickup device.
FIG. 3 is a conceptual diagram showing an overview of a lens information registration system.

The following describes operations of the registration apparatus according to the first embodiment as well as shows coordination with the image pickup apparatus described above. FIG. 3 is a conceptual diagram showing an overview of a lens information registration system 1. As shown in FIG. 3, in the lens information registration system 1, the image pickup apparatus 301 indicates a digital camera that has the optical correction functions described above, and it is assumed that different lens apparatuses 11 can be attached and removed.

The registration apparatus 302 is an information device such as a so-called personal computer, and it is assumed that an application program that can communicate with the image pickup apparatus 301 is installed therein. It is also assumed that the registration apparatus 302 has registered therein correction values of the optical characteristics correction data described above for various types of lens apparatuses.

Since the registration apparatus 302 generally has a sufficient recording capacity, it is assumed that all correction values for lens apparatuses 11 that the image pickup apparatus 301 is compatible with are recorded therein. The means for recording the optical characteristics correction data described above in the registration apparatus 302 may be, for example, connecting to the Internet and downloading the data, or directly recording the data from an external recording medium to the personal computer.

In order to obtain the optical characteristics correction data, the image pickup apparatus 301 can, for example record necessary data from among the optical characteristics correction data recorded in the registration apparatus 302, from the data interface unit 31 shown in FIG. 1 to the central control unit 34 also shown in FIG. 1 via a USB cable 303.

Figure 4:
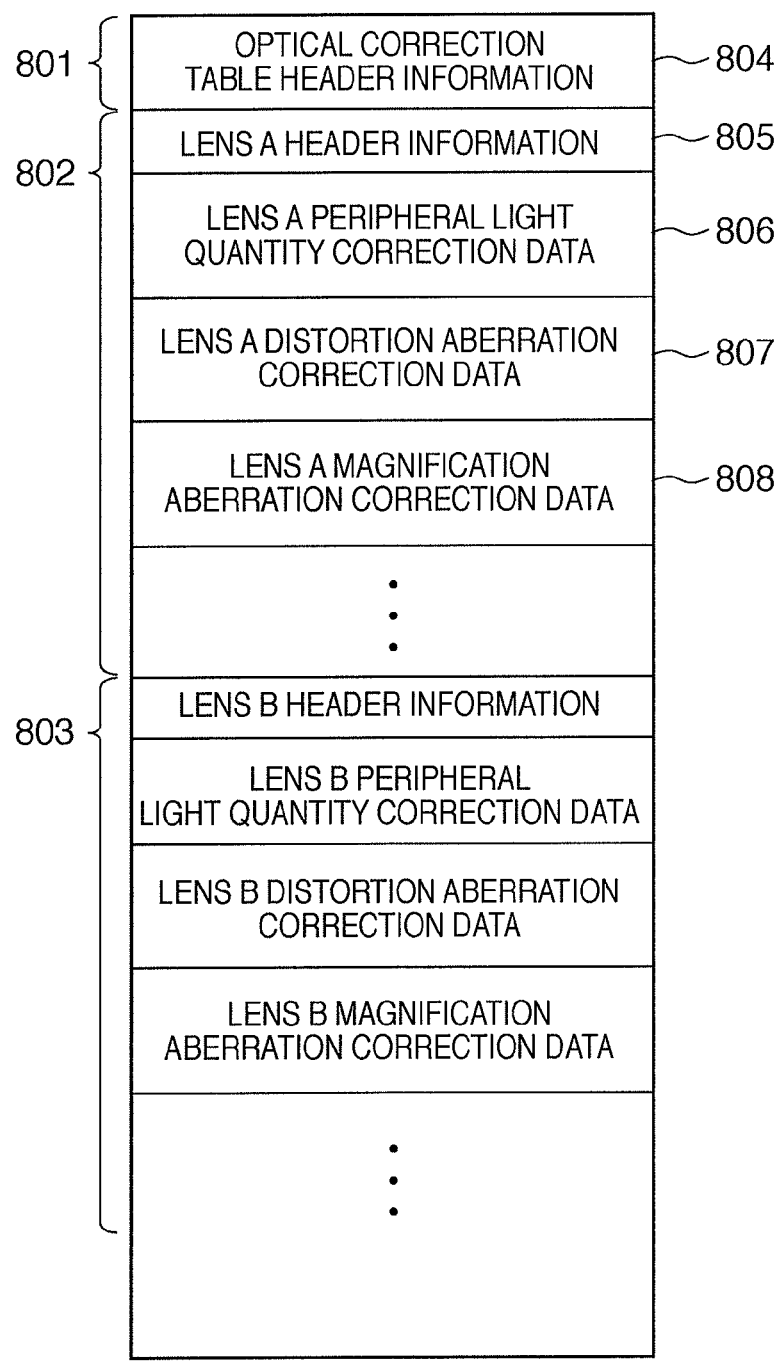
FIG. 4 is a conceptual diagram showing an exemplary configuration of recorded content on a recording medium on which optical characteristics correction data is recorded.

FIG. 4 is a diagram showing an exemplary configuration of recorded content on a recording medium on which optical characteristics correction data is recorded. It is sufficient for the structure in which the optical characteristics correction data is recorded in the central control unit 34 of the image pickup apparatus 301 to be the same as the structure in which the optical characteristics correction data is recorded in the registration apparatus 302. The data configuration of the recording medium is mainly divided into an area 801 for an overall optical characteristics correction table, and lens data areas 802 and 803 for respective lenses, and a lens data area is provided for each lens for which correction is performed.

The information recorded in optical correction table header information 804 in the area 801 can be, for example, the number of lenses that are accommodated by the optical correction table, the data amount of correction data for each lens, and the data amount of each optical correction data piece.

Header information 805 of each lens data piece has recorded therein, for example, model identifying information that is unique to each lens apparatus (e.g., a lens ID (identification information) or lens name), as well as the Tele end and Wide end focal length, shortest shooting distance, and an open aperture value of the corresponding lens, such that this information can be referenced. Such information is used to identify the lens apparatus, and is used as parameters when performing correction calculations. By referencing the lens ID in the header information 805 and reading data that matches the lens ID read from the lens apparatus, it is possible to read optical characteristics correction data that corresponds to the lens apparatus. In other words, the information that identifies the model of the lens apparatus (e.g., a lens name) and lens information including corresponding correction information is stored on the recording medium such that referencing by the lens ID is possible.

The lens data area for each lens has recorded therein correction values for the corresponding optical correction. For example, recorded as peripheral light quantity correction data 806 is data indicating the degree of a drop in light quantity at various distances from the optical axis center for each zoom position, focus position, and aperture position. Also, recorded as distortion aberration correction data 807 is data indicating the degree of actual distortion with respect to the ideal image height at various distances from the optical axis center for each zoom position, focus position, and aperture position. Recorded as magnification chromatic aberration correction data 808 are correction values such as the degree to which an image formation position of the R or B component is shifted with respect to the G component at various distances from the optical axis center for each zoom position, focus position, and aperture position. The optical characteristics to be corrected and the data content are of course not limited to the above description.

Figure 13:
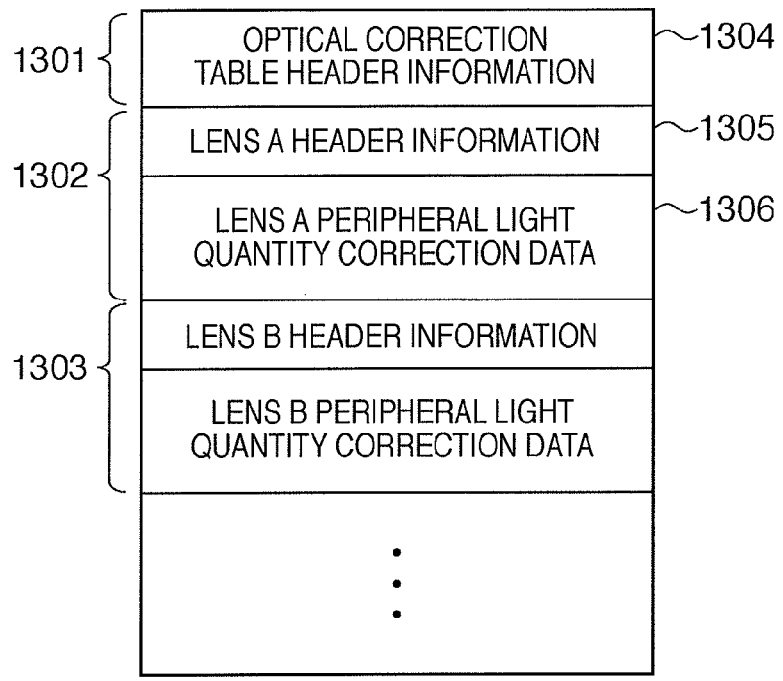
FIG. 13 is a diagram showing an exemplary configuration of optical characteristics correction data stored in the image pickup apparatus that can only perform peripheral light quantity correction.

The following describes an exemplary configuration of the optical characteristics correction data stored in the internal memory 34*b* of the image pickup apparatus 301 with reference to FIG. 13. In the example shown in FIG. 13, it is assumed that the image pickup apparatus 301 can perform only peripheral light quantity correction as image degradation correction processing. If the image pickup apparatus 301 performs only peripheral light quantity correction, it is not necessary to store optical correction data (i.e., the distortion aberration correction data 807 and the magnification chromatic aberration correction data 808 shown in FIG. 4) other than peripheral light quantity correction data. The data structure shown in FIG. 13 therefore has an area 1301 for an overall optical characteristics correction table, and areas 1302 and 1303 for respective lens apparatuses that can be attached to the image pickup apparatus 301.

Similarly to the area 801 shown in FIG. 4, the area 1301 has stored therein optical correction table header information 1304 relating to lens apparatuses registered in the image pickup apparatus 301 (the registration of lens apparatuses is described later).

Similarly to the header information 805 shown in FIG. 4, the areas 1302 and 1303 for respective lens apparatuses have stored therein information (header information 1305) relating to lens apparatuses registered in the image pickup apparatus 301. The areas 1302 and 1303 for respective lens apparatuses have further stored therein peripheral light quantity correction data 1306 for each lens apparatus registered in the image pickup apparatus 301.

Although FIG. 13 shows only the areas 1302 and 1303 for the two lenses apparatuses A and B respectively, in actuality, respective areas are provided for all lens apparatuses that are registered in the image pickup apparatus 301.

Of course, if the image pickup apparatus 301 can perform distortion aberration correction and magnification chromatic aberration correction in addition to peripheral light quantity correction, it is sufficient for the data structure shown in FIG. 13 to be the same as the data structure shown in FIG. 4.

Figure 5:
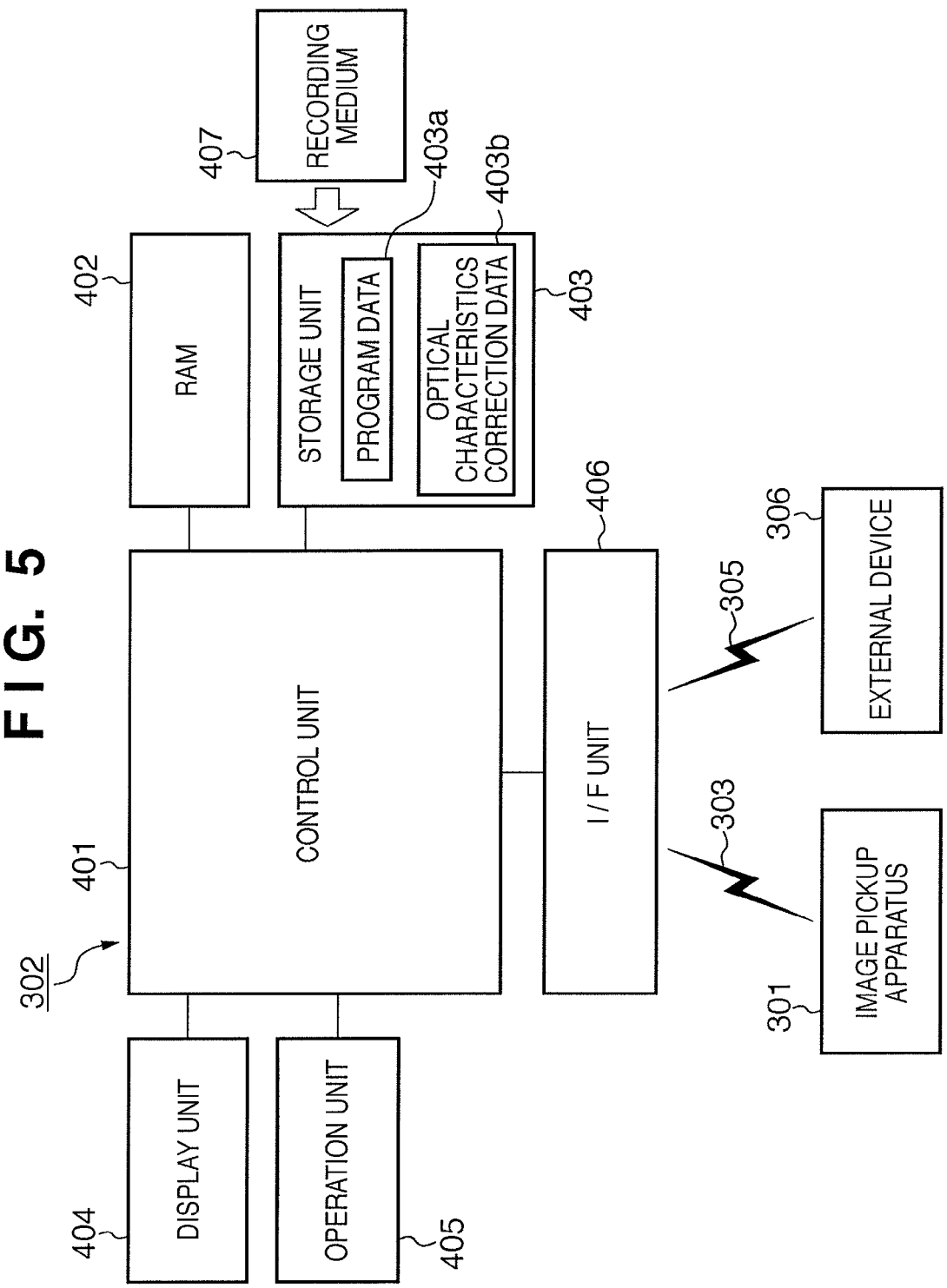
FIG. 5 is a block diagram showing a configuration of a registration apparatus.

The following describes the configuration of the registration apparatus 302 with reference to FIG. 5. As shown in FIG.

5, the registration apparatus 302 includes a control unit 401, a RAM (Random Access Memory) 402, a storage unit 403, a display unit 404, an operation unit 405, and an I/F unit 406.

The control unit 401 is configured from a CPU and the like, and centrally controls the operations of units in the registration apparatus 302. Specifically, the control unit 401 controls the operations of the units by expanding program data 403a stored in the storage unit 403 to the RAM 402, and sequentially executing the program data 403a.

As a lens information storage means, the storage unit 403 is a ROM (Read Only Memory), an HDD (Hard Disk Drive), or the like, and stores the program data 403a and optical characteristics correction data 403b. Also, a recording medium 407 can be mounted to and removed from the storage unit 403 by a connector (not shown), and the storage unit 403 can, for example, read data stored on the recording medium 407 and write data to the recording medium 407. For example, the program data 403a, the optical characteristics correction data 403b, and the like may be read from the recording medium 407 and stored in the storage unit 403. The program data 403a is, for example, the application program described above, and the optical characteristics correction data 403b is the above-described optical characteristics correction data that has been read from the recording medium and stored in the storage unit 403.

The display unit 404 is a display apparatus such as an LCD (Liquid Crystal Display), and displays windows under the control of the control unit 401. Specifically, the display unit 404 displays UI-related windows that are described later. The operation unit 405 is a keyboard, pointing device, or the like, and receives operation input from a user and outputs the operation input to the control unit 401. Specifically, the operation unit 405 receives operation instructions from the user via the UI, such as a registration instruction originating from the designation of the model of a lens apparatus whose correction information is to be registered.

The I/F unit 406 is an interface that, under the control of the control unit 401, connects to an external device wirelessly or by wire so as to enable communication with the external device. Specifically, the I/F unit 406 connects to and performs USB communication with the image pickup apparatus 301 via the USB cable 303. The I/F unit 406 also connects to and performs data communication with an external device 306 via a communication network 305 such as the Internet or a LAN (Local Area Network) in accordance with a predetermined communication protocol. An example of data communication with the external device 306 via the communication network 305 is downloading the optical characteristics correction data described above via the Internet.

Figure 6:
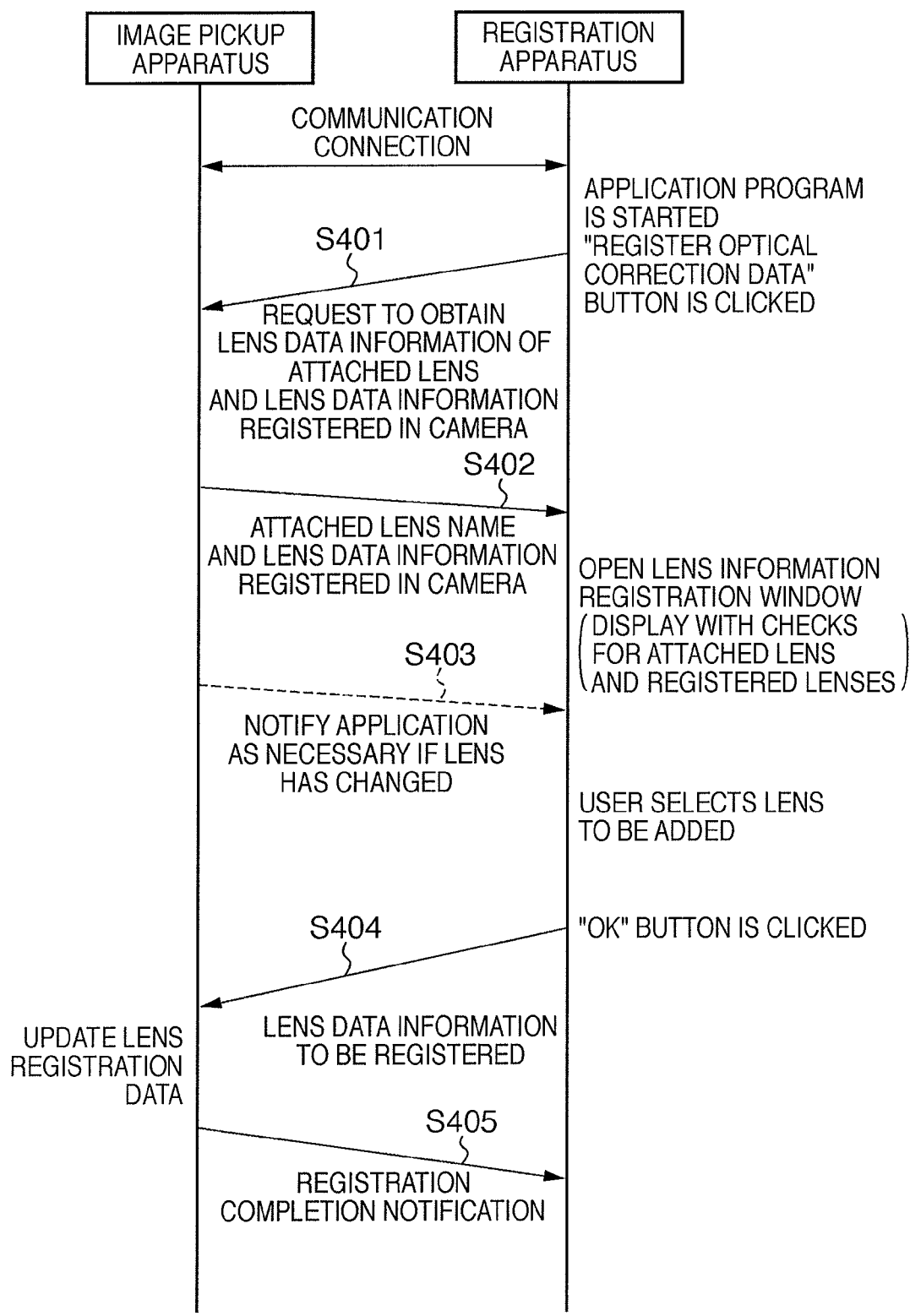
FIG. 6 is a ladder chart showing operations performed by the image pickup apparatus and the registration apparatus.
Figure 7:
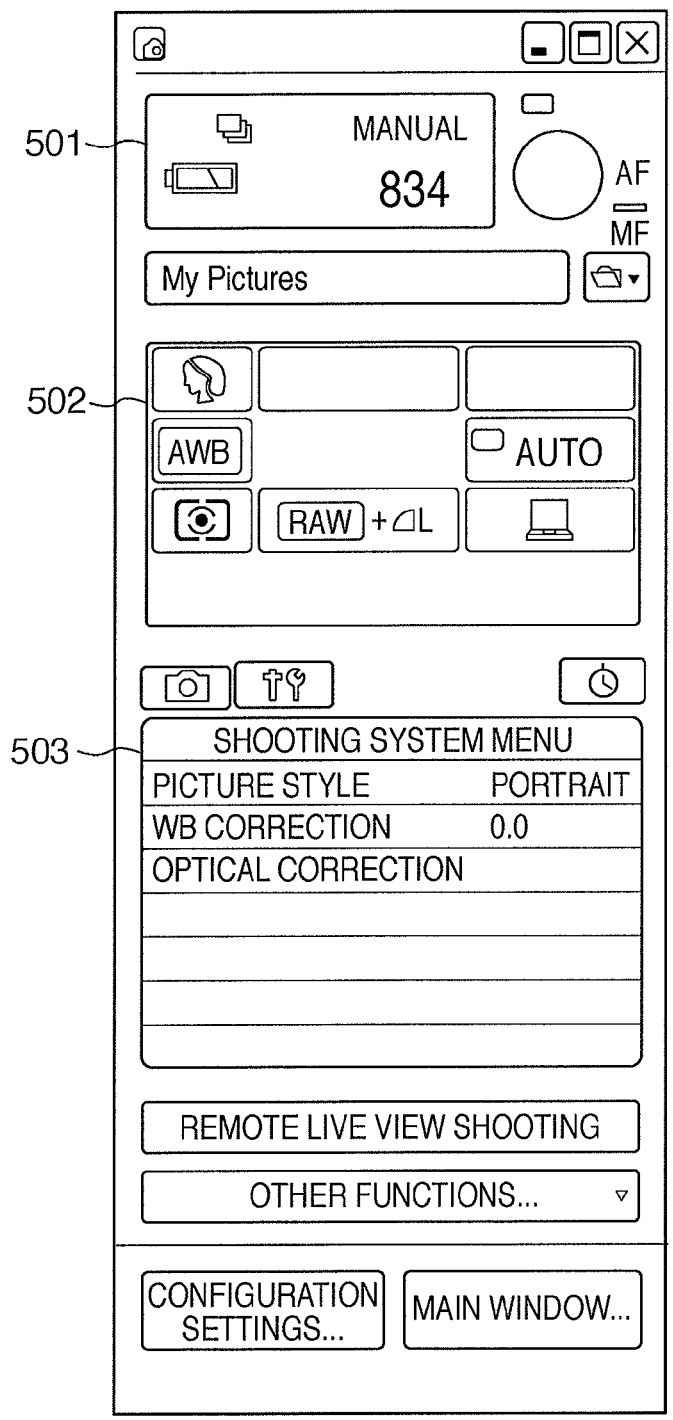
FIG. 7 is a conceptual diagram showing an exemplary user interface (UI) window.
Figure 8:
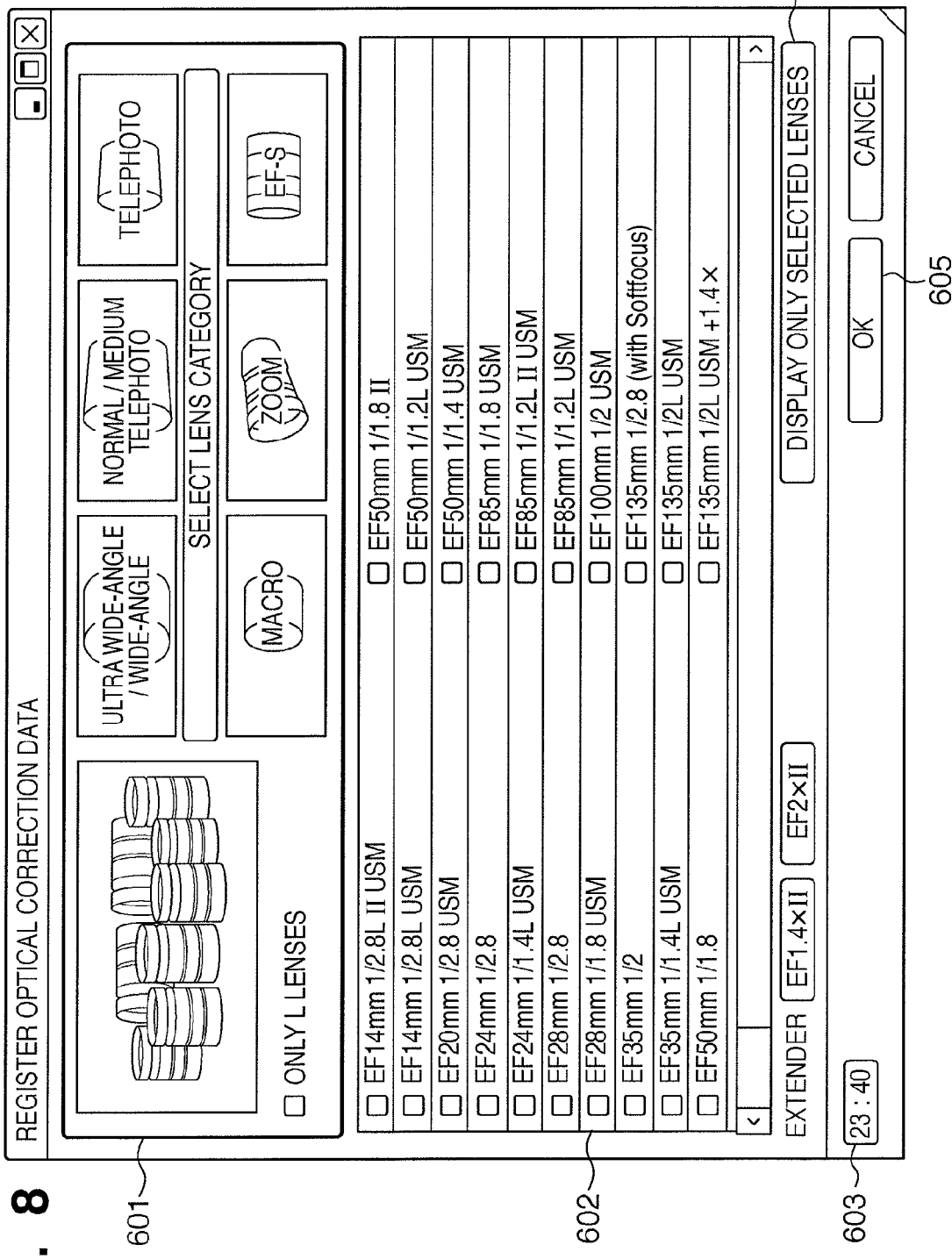
FIG. 8 is a conceptual diagram showing an exemplary UI window.
Figure 14:
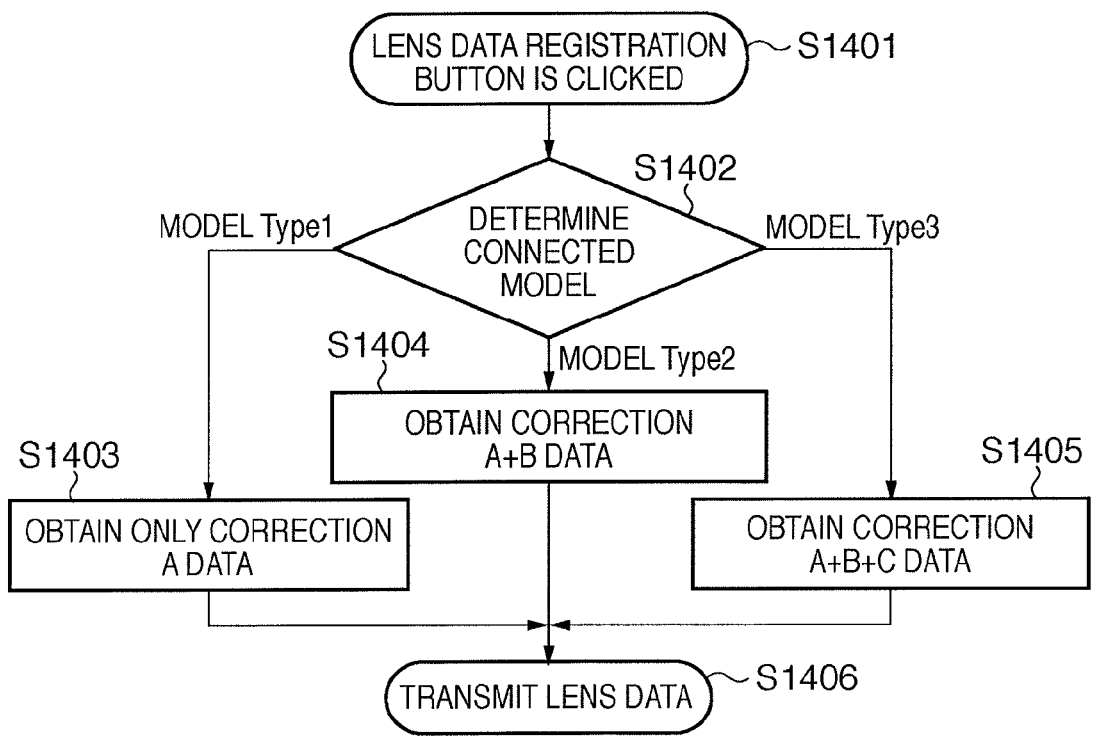
FIG. 14 is a flowchart showing processing performed in step S711 of FIG. 9.

The following describes operations performed by the image pickup apparatus 301 and the registration apparatus 302 in the lens information registration system 1 with reference to FIGS. 6, 7, 8, 9, and 14. FIG. 6 is a ladder chart showing operations performed by the image pickup apparatus 301 and the registration apparatus 302. FIGS. 7 and 8 show exemplary UI windows displayed by the display unit 404 according to the application program described above, and FIG. 9 is a flowchart showing a flow of processing in the registration apparatus 302. FIG. 14 is a flowchart showing processing performed in step S711 of FIG. 9.

As shown in FIG. 6, in the registration apparatus 302, when a communication connection with the image pickup apparatus 301 has been confirmed, under the control of the control unit 401, the application program is started and a UI is displayed by the display unit 404. The UI displayed by the display unit 404 when the application program is started is a UI related to selections in a main menu, and this UI has areas 501, 502, and 503 as shown in FIG. 7.

The area 501 displays settings of the connected image pickup apparatus 301 that cannot be modified using the application. Specific examples of these settings include the drive mode (single shot, continuous shooting), the shooting mode (manual, aperture priority, shutter priority, etc.), the remaining battery life, and the remaining number of photographs that can be shot. The area 502 displays settings of the image pickup apparatus 301 that can be changed using the application. Specific examples of these settings include the white balance mode, the ISO sensitivity, the recording image quality, and the photometric mode. A shooting system menu is displayed in the area 503, and mainly image-related settings can be performed. For example, it is possible to select a mode for outputting colors and a brightness specialized for a specific object (e.g., "landscape mode" or "portrait mode"), and it is possible to set WB correction for finely adjusting the white balance set in the area 502. The optical characteristics correction data of the present invention can also be registered in the area 503. Note that the arrangement in this UI window is not limited to the above description.

Figure 9:
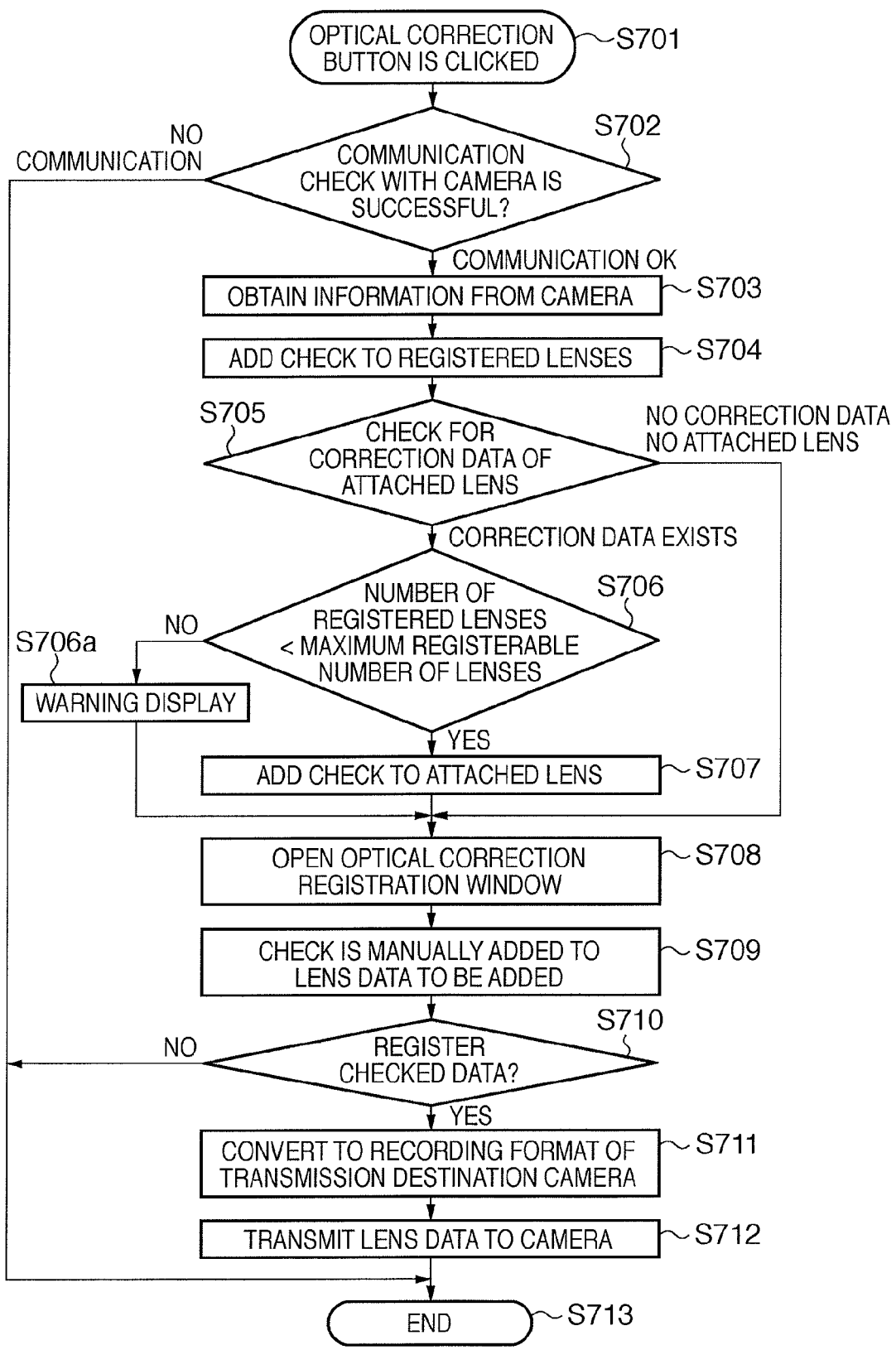
FIG. 9 is a flowchart showing a flow of processing in the registration apparatus.

The following describes processing in the case of registering a desired lens apparatus's optical characteristics correction data in the registration apparatus 302 that is in the possession of a user, with reference to mainly FIGS. 6, 8, 9, and 14. As shown in FIG. 9, upon the user clicking the "optical correction" button in the area 503, the control unit 401 of the registration apparatus 302 starts processing for registering optical characteristics correction data in the image pickup apparatus 301 (S701).

After the processing has started in step S701, the control unit 401 performs a communication check with the image pickup apparatus 301 (S702). In the check performed in step S702, the registration apparatus 302 requests the connected image pickup apparatus 301 to transmit the identification information of the lens apparatus 11 that is currently attached and the optical characteristics correction data that is pre-registered in the central control unit 34 of the image pickup apparatus 301 (S401). Upon receiving the request, the image pickup apparatus 301 transmits the identification information of the lens apparatus that is currently attached (e.g., the name and lens ID) and the optical characteristics correction data that is registered in the central control unit 34 to the registration apparatus 302 (S402).

As a result of the processing in step S401 and step S402, the registration apparatus 302 obtains the identification information of the lens apparatus 11 that is attached to the image pickup apparatus 301 and is to be registered. In step S402, the entire structure shown in FIG. 13 may be transmitted as the information, or only the identification information of registered lens apparatuses may be extracted and transmitted as the information. In other words, in step S402, the identification information of registered lens apparatuses whose optical characteristics correction data is pre-stored in the central control unit 34 is transmitted as a reply.

When the communication check described above has ended, the control unit 401 obtains the information transmitted from the image pickup apparatus 301 as a reply (S703), and prepares to cause the display unit 404 to, before the transmission of the data to be registered, display a UI used when performing lens registration. The window displayed by the display unit 404 as the UI is a confirmation window for confirming data content before the transmission of data to be registered, and as shown in FIG. 8, this window has an area 601, an area 602, an area 603, a button 604, and an OK button 605.

The area 602 displays a list of, for example, the names (models) of lens apparatuses that are recorded in the registration apparatus 302 and for which optical correction can be performed. The display of this list is performed by the control unit 401 reading the optical characteristics correction data 403*b* stored in the storage unit 403. Also, the control unit 401 adds a check to the checkbox in front of each lens name displayed in the area 602 that corresponds to a lens apparatus whose optical characteristics correction data obtained in step S402 is already registered (S704). In other words, the area 602 displays a list of lens apparatuses that are recorded in the registration apparatus 302, as well as lens apparatuses whose correction information is stored and registered in the image pickup apparatus 301 such that they can be distinguished from other lens apparatuses based on the existence of checks. Accordingly, it is possible in the area 602 to explicitly inform the user of lens apparatuses whose optical characteristics correction data is already registered in the image pickup apparatus 301.

Meanwhile, based on the identification information obtained in step S402, the control unit 401 determines whether the optical characteristics correction data recorded in the registration apparatus 302 includes optical characteristics correction data related to the attached lens apparatus (S705). In other words, in step S705, the control unit 401 determines whether the optical characteristics correction data related to the lens apparatus that is currently attached to the image pickup apparatus 301 is recorded in the registration apparatus 302.

If the control unit 401 determines in step S705 that the optical characteristics correction data is recorded, based on the registered optical characteristics correction data that was obtained in step S402, the control unit 401 determines whether the total number of models of registered lens apparatuses is not more than the number of models that can be registered in the image pickup apparatus 301 (S706). More specifically, the control unit 401 compares a total of the number of registered lens apparatuses and the number of lens apparatuses to be registered, against a predetermined setting in the memory or the like indicating the number of lens apparatuses that can be registered, and determines whether the former is not more than the latter.

If the control unit 401 has determined in step S706 that the number of registered lens apparatuses is less than the number of lens apparatuses that can be registered, the control unit 401 adds a check to the checkbox of the name of the attached lens apparatus that is displayed in the area 602 as described above (S707). In other words, as a result of step S707, the registration apparatus 302 displays the attached lens apparatus and other lens apparatuses so as to be distinguishable from each other based on checks in checkboxes. Here, if the optical characteristics correction data of the attached lens apparatuses is not recorded in the registration apparatus 302, or if the number of registered lens apparatuses is greater than or equal to the number of lens apparatuses that can be registered, the control unit 401 displays a warning display on the display unit 404 using a popup window or the like (S706*a*). By this warning display, the registration apparatus 302 can notify the user that no more lens apparatuses can be registered in the image pickup apparatus 301, or that the optical characteristics correction data of the attached lens apparatus does not exist.

When the processing described above has been completed, the control unit 401 displays the UI shown in FIG. 8 on the display unit 404 (S708). This enables the user to find out at a glance which lens apparatuses are registered in the image pickup apparatus 301, and which lens apparatuses have not been registered. Here, the means for notifying the user is not limited to the checkboxes described above as an example. Note that if merely checks are added to checkboxes, it is impossible to distinguish between the lens apparatus that was attached and already-registered lens apparatuses in the display. Therefore, when adding a check to the checkbox for the attached lens apparatus, the display may be made explicit by displaying, for example, "Attached lens A has been added" in the area 603 or the like. Rather than being limited to the area 603, the displaying means can be a method of, for example, changing the color of the characters in the corresponding lens name displayed in the area 602.

If the currently attached lens apparatus 11 is exchanged while the UI shown in FIG. 8 is being displayed by the display unit 404, under the control of the central control unit 34 that is an exchange notifying means, the image pickup apparatus 301 transmits the identification information of the lens apparatus that is newly attached after the exchange to the registration apparatus 302 (S403). Upon obtaining such identification information, the control unit 401 of the registration apparatus 302 determines whether the optical characteristics correction data of the newly attached lens apparatus is recorded in the registration apparatus 302. If the optical characteristics correction data is already recorded, the control unit 401 adds a check to the checkbox for the name of the newly attached lens apparatus in the area 602, and updates the display of the UI. If the optical characteristics correction data is not recorded, the control unit 401 may display a warning display on the display unit 404.

When updating the display of this UI, it is preferable to not uncheck the checkbox for the lens apparatus that was attached before the exchange. By not unchecking this checkbox, the number of checks is increased as lens apparatuses are exchanged one after another. Accordingly, a user who possesses multiple lens apparatuses can efficiently register the optical characteristics correction data of the lens apparatuses in the image pickup apparatus 301 by merely exchanging the lens apparatus attached to the image pickup apparatus 301.

The control unit 401 also receives an additional user selection of checkboxes for the lens apparatuses displayed in the area 602 via the operation unit 405 that is a mouse or the like, and adds checks in accordance with the selection instruction (S709). In this case, the user selects a desired lens from the lens name list in the area 602. For example, the user selects, from the lens name list, a lens apparatus name (model) that is different from the lens apparatus attached to the image pickup apparatus 301.

In general, dozens of removable lenses can be attached to a lens-replaceable image pickup apparatus, and some image pickup apparatuses are compatible with over a hundred lenses. The user must find a desired lens from among these, and making the selection from a list of all lenses is very difficult. For this reason, the area 601 includes category-specific selection buttons such as "ultra wide-angle/wide-angle", "normal/medium telephoto", "telephoto", "macro", "zoom", and "APS-C sensor lens". In accordance with the user operation instruction received via the selection buttons arranged in the area 601, the control unit 401 displays only the lens apparatuses in the selected category in the area 602. This enables the user to efficiently find a desired lens when making a selection from the lens name list.

Also, upon receiving a user instruction via the button 604, the control unit 401 displays only the lens apparatuses that have checks in the area 602. This enables the user to see at a glance a list of lens apparatuses to be registered. Also, the area 603 displays the maximum number of lens apparatuses that can be registered in the image pickup apparatus 301 and the number of lenses that are currently registered in the image pickup apparatus 301, thereby showing how many more lens apparatuses can be registered.

When a check is added to the checkbox of a lens apparatus in step S709, if a correction function related to the checked lens apparatus is restricted, the control unit 401 may display a warning display on the display unit 404 when the checkbox is checked. In other words, a warning display is displayed if, in step S709, the correction information included in the checked lens information that is to be registered satisfies a warning condition pre-set in the memory, such as a correction function being restricted.

One example of a warning condition for which a warning display is to be displayed is the case in which the lens apparatus that has been checked does not have range information. In general, most lens apparatuses transmit information such as focal length information and an aperture value to the image pickup apparatus through communication with the image pickup apparatus. However, there are many lens apparatuses that do not transmit, to the image pickup apparatus, range information that does not readily vary according to the optical system. In the case of such a lens apparatus, it is highly possible for correction to not be appropriately applied, compared to other lens apparatuses that transmit range information. It is completely impossible to determine whether a lens apparatus transmits range information based on the lens name etc. Accordingly, by warning the user to this effect when such a lens apparatus is checked, the user can use the correction function in the image pickup apparatus after being made aware of the risk that correction will not be appropriately applied.

Another example of a case in which a warning display is to be displayed is the case of a lens apparatus that has an optical characteristic for which correction cannot be performed, and in this case, a warning display to that effect is displayed. For example, if distortion aberration correction is to be performed with a lens apparatus such as a fish-eye lens, a very large amount of correction will need to be performed. Performing such correction in the case of this lens is a burden on the system and the correction is difficult, and there are cases in which the image pickup apparatus 301 cannot accommodate the correction. However, peripheral light quantity correction, magnification aberration correction, and the like can be performed similarly to other lens apparatuses. When such a lens apparatus exists and the lens apparatus is checked, the user may be notified by displaying a warning display on the display unit 404 to the effect that distortion aberration correction cannot be performed.

It is sufficient for information indicating whether the lens apparatus has the range information described above, and information indicating whether the lens apparatus is a lens apparatus for which distortion aberration correction can be performed to be recorded in the header information 805 of the optical characteristics correction table shown in FIG. 4. When a check has been added, by referencing the optical characteristics correction data 403b, the control unit 401 can determine whether to display the warning displays described above, and display a warning display on the display unit 404 when necessary.

The user clicks the OK button 605 upon completing the selection, and thus the control unit 401 determines whether a data registration instruction has been received from the user according to whether the OK button 605 has been operated (S710). Here, the application changes the format of the optical correction data so as to be compatible with the model of the image pickup apparatus 301 in which the optical correction data is to be registered (S711).

The following describes this processing with reference to FIG. 14. First, when the OK button 605 has been clicked (S1401), based on information relating to the image pickup apparatus 301 that has been obtained beforehand, the application determines the model of the image pickup apparatus 301 that is connected to the registration apparatus 302 (S1402). The following describes an example in which there are three image pickup apparatus models, namely Type1, Type2, and Type3.

Type1 is a model that can only perform correction A (e.g., peripheral light quantity correction). Type2 is a model that can only perform correction A and correction B (e.g., peripheral light quantity correction and distortion aberration correction). Type3 is a model that can perform correction A, correction B, and correction C (peripheral light quantity correction, distortion aberration correction, and magnification chromatic aberration correction).

The following describes the case in which the image pickup apparatus 301 connected to the registration apparatus 302 has been determined to be Type1. In this case, the application performs the following processing. Among the optical characteristics correction data stored in the registration apparatus 302 (FIG. 4), the application extracts only optical characteristics correction data necessary for Type1 (peripheral light quantity correction data) from the optical characteristics correction data of the lens apparatus to be registered this time (S1403). The application then converts the extracted optical characteristics correction data into a format for storage in the Type1 image pickup apparatus. An example of the configuration of the optical characteristics correction data after format conversion is shown in FIG. 13. Note that the processing of step S1404 and step S1405 is performed in the cases of Type2 and Type3 image pickup apparatuses respectively.

When format conversion has ended, the application transmits the converted optical characteristics correction data to the image pickup apparatus 301 (S1406, S712, S404).

Then, in the image pickup apparatus 301, the optical characteristics correction data is recorded to the internal memory 34b based on the registration information transmitted from the registration apparatus 302 (storage content updating), and thereafter the central control unit 34 transmits a registration completion notification to the registration apparatus 302 (S405). In the registration apparatus 302, when the registration completion notification has been received, the above-described processing performed by the control unit 401 is ended (S713). This series of processing enables the user to efficiently register the optical characteristics correction data of a desired lens apparatus in the image pickup apparatus 301 that is in the user's possession.

Second Embodiment

The following describes a second embodiment of the present invention in which the structure of the recorded optical characteristics correction data in the central control unit 34 of the image pickup apparatus 301 is different from the structure of the recorded optical characteristics correction data in the storage unit 403 in the registration apparatus 302. Note that a description of the image pickup apparatus 301 and the registration apparatus 302 according to the second embodiment has been omitted since they are the same as in the first embodiment.

In the first embodiment, the optical characteristics correction data is described as being recorded using the same structure in the image pickup apparatus 301 and the registration apparatus 302, as shown in FIGS. 4 and 13. However, the following problem occurs when the recording structure is the same. Note that although part of the correction data (specifically distortion aberration correction data and magnification aberration correction data) is missing in FIG. 13, the structures in FIG. 13 and FIG. 4 would be the same if this part were included, and therefore the correction data shown in FIG. 13 and FIG. 4 is treated as having "the same" structure.

If the optical characteristics correction table is managed according to lens IDs, the user performs registration by making a determination based on the names of lens apparatuses, as shown in the area 602 of FIG. 8. There is no problem if the lens IDs and names completely correspond one-to-one, but in reality there are cases in which multiple lens IDs are assigned to lenses that have the same name and optical system.

This occurs in a situation such as, for example, when the firmware in a lens apparatus is changed during lens production, and there is a need to distinguish between old-firmware and new-firmware lens apparatuses that have the same name, different lens IDs are assigned to the lens apparatuses. Such lens apparatuses have different lens IDs even though the name and optical system is the same. If the recording structure for correction data for such lens apparatuses is the same between the image pickup apparatus 301 and the registration apparatus 302 as described in the first embodiment, the user would of course not be able to know which lens apparatus names have multiple lens IDs. Accordingly, there is the problem that when the user selects a certain lens apparatus, there may be a sudden increase in the number of registered lenses shown in the area 603, which creates a situation that is difficult for the user to understand. Also, even if the maximum number of lenses that can be registered has been determined, it is not actually possible to register the maximum number of lenses.

Figure 10:
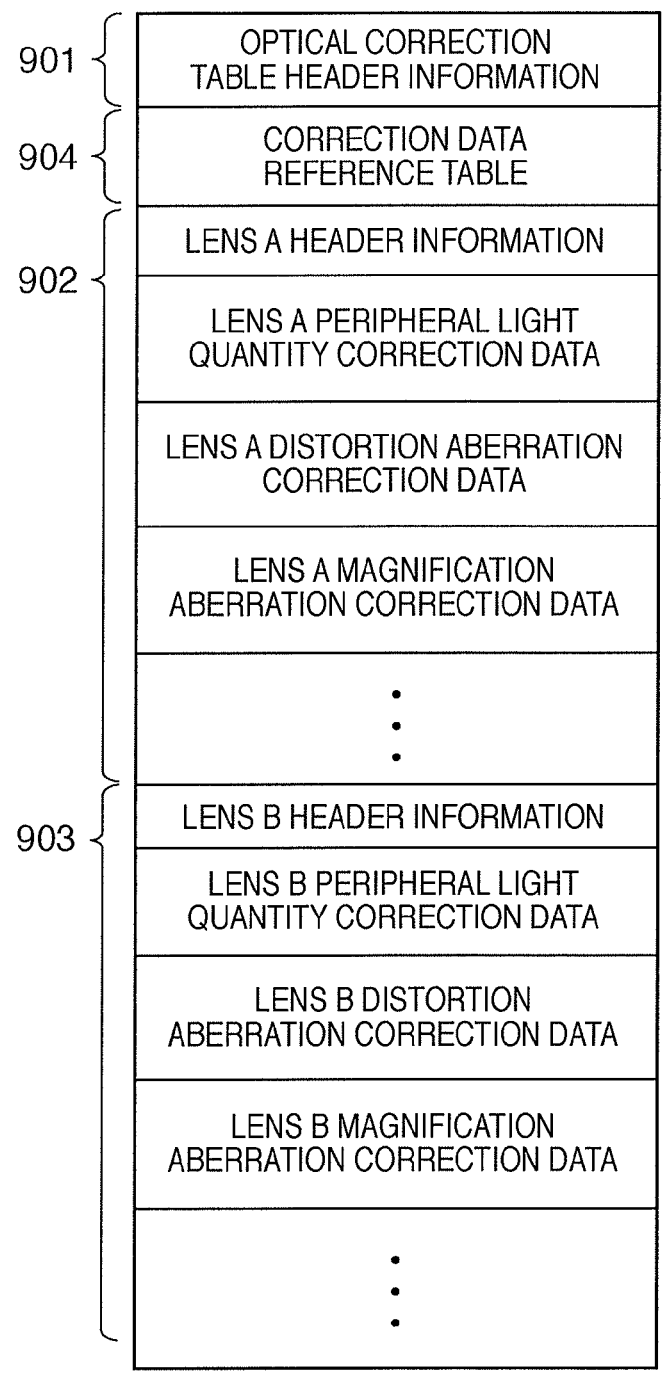
FIG. 10 is a conceptual diagram showing an exemplary configuration of recorded content in a central control unit in an image pickup apparatus according to a second embodiment.
Figure 11:
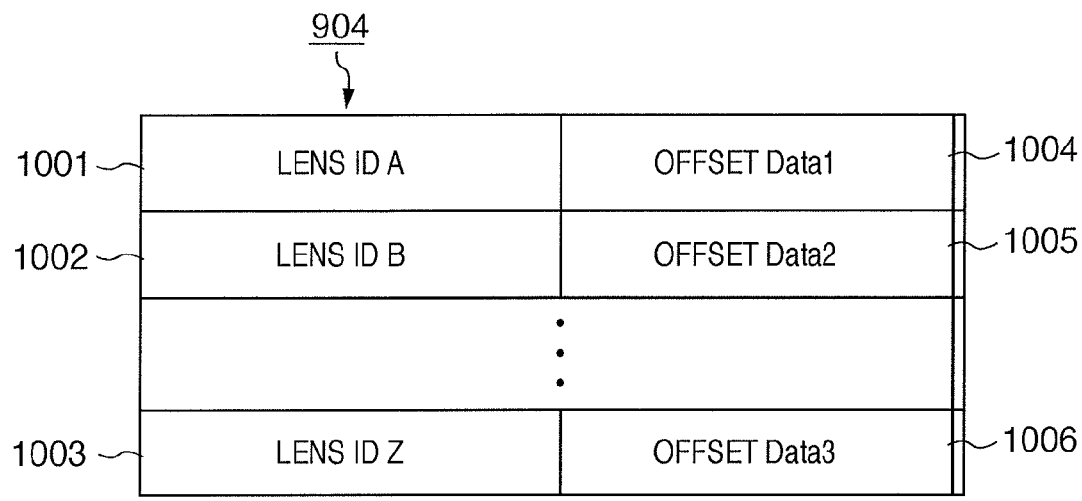
FIG. 11 is a conceptual diagram showing an exemplary configuration of a correction data reference table.
Figure 12:
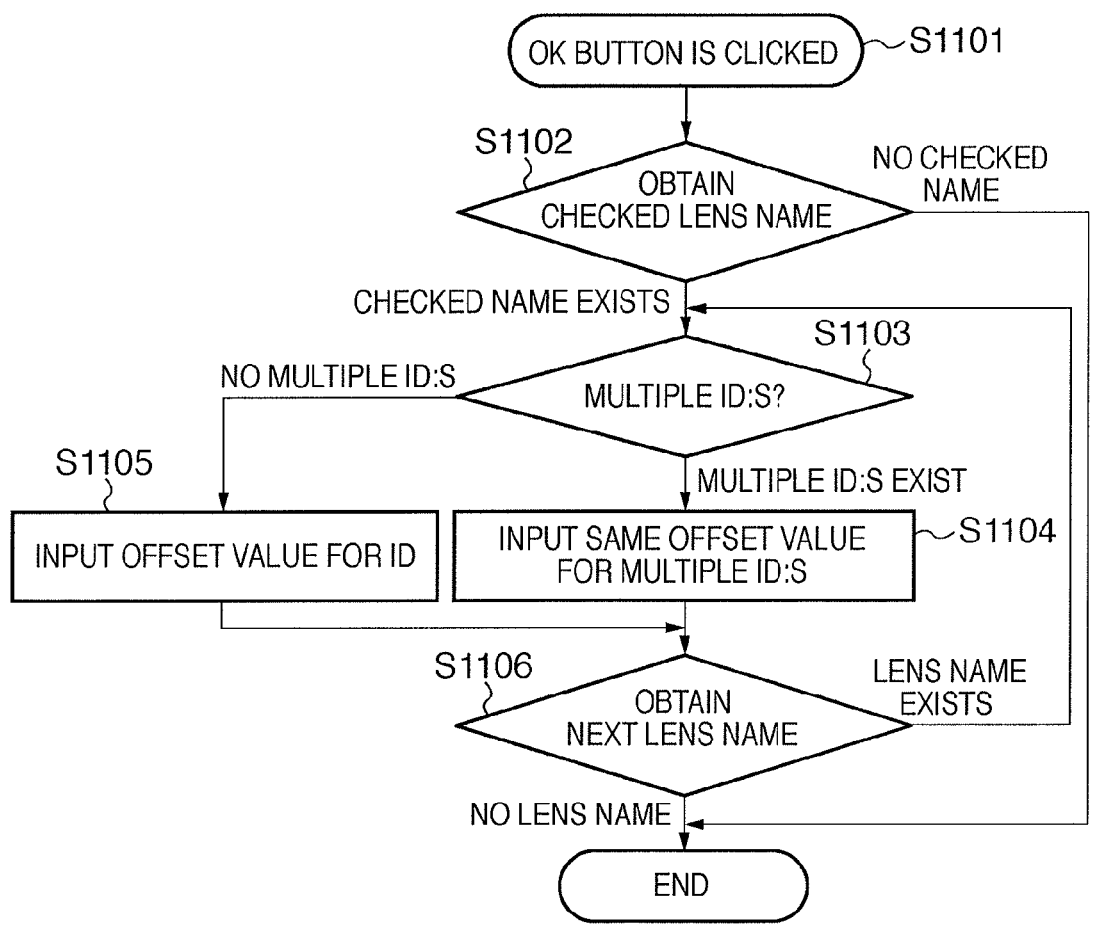
FIG. 12 is a flowchart showing a flow of processing in a registration apparatus according to the second embodiment.

The second embodiment describes a method for addressing this problem with reference to FIGS. 10, 11, and 12. FIG. 10 is a conceptual diagram showing an exemplary configuration of recorded content in the central control unit 34 of the image pickup apparatus 301 according to the second embodiment. FIG. 10 is different from FIG. 4 described above with respect to the addition of a correction data reference table 904 between an area 901 and a lens data area 902.

As shown in FIG. 11, the correction data reference table 904 is roughly divided into two areas. One area includes areas 1001 to 1003 in which lens IDs are recorded. The other area includes areas 1004 to 1006 in which offset Data1 to Data3, which respectively correspond to the lens IDs in the areas 1001 to 1003, are recorded. The offset data is a value indicating an offset amount from the address at which the optical characteristics correction data of the corresponding lens ID is recorded, that is to say, the offset data is reference destination information for referencing correction information by identification information. Accordingly, by appropriately setting the offset data, the correction data reference table 904 enables the same correction information to be referenced by different identification information. The number of combinations of lens IDs and offset data is set higher than the maximum number of lenses that can be registered.

The following describes a flow of operations performed by the registration apparatus 302 when optical characteristics correction data is registered from the registration apparatus 302 to the image pickup apparatus 301 using this recording method, with reference to FIG. 12. First, when the user has selected optical characteristics correction data to be written to the image pickup apparatus 301 using the same method as in the first embodiment, the OK button 605 shown in FIG. 8 is operated. Accordingly, as shown in FIG. 12, upon detecting that the OK button 605 has been clicked, the control unit 401 starts performing processing according to the second embodiment (S1101).

When processing has started, the control unit 401 internally performs the following processing before transmitting optical characteristics correction data to the image pickup apparatus 301. First, the control unit 401 obtains all lens names that are checked (S1102). If none of the lenses are checked in step S1102, the control unit 401 transmits a table including blank optical characteristics correction data to the image pickup apparatus 301 (corresponds to step S404 in FIG. 4).

If checked lenses exist in step S1102, the control unit 401 references the optical characteristics correction data 403*b*, and seeks one-by-one for optical characteristics correction data relating to the checked lens apparatuses. Specifically, the control unit 401 first determines whether the first checked lens apparatus has multiple lens IDs (S1103). Specifically, in step S1103, the control unit 401 determines whether the optical characteristics correction data 403*b* includes optical characteristics correction data pieces that are for the same lens apparatus name as the lens apparatus to be registered, but are referenced by different lens IDs.

If the first checked lens apparatus does not have multiple lens IDs, the control unit 401 records the corresponding lens ID in the first area (area 1001) among the areas shown in FIG. 11. The control unit 401 also records an offset value from the location of the optical characteristics correction data for the lens ID in the area (area 1004) corresponding to the first area (S1105).

The following describes a case in which the first lens apparatus has multiple lens IDs. Assume the case in which one lens name has two lens IDs. The control unit 401 records one of the two lens IDs in the first area (area 1001) among the areas shown in FIG. 11, and records an offset value from the location of the optical characteristics correction data in the area (area 1004) corresponding to the first area. Furthermore, the control unit 401 records the other lens ID in the area 1002, and records the same offset value from the location of the optical characteristics correction data (i.e., the same value as in the area 1004) in the area 1005 (S1104). In other words, in step S1104, the control unit 401 records reference destination information for referencing the same optical characteristics correction data by different lens IDs. Accordingly, for lens apparatuses whose names (models) are the same but have different identification information, only one of the recorded registration information pieces for these lens apparatuses includes correction information. The other registration information pieces that are recorded for these lens apparatus include reference destination information for referencing the one registration information piece instead of including correction information.

According to the processing described above, if there are lens apparatuses that have different lens IDs but have the same optical system, and the difference between the lens IDs exists simply to distinguish between an old-firmware lens apparatus and a new-firmware lens apparatus, the same optical characteristics correction data can be shared between the different lens IDs. In this way, adding the correction data reference table 904 to the optical characteristics correction data eliminates the need to have redundant correction information related to multiple lens IDs. Furthermore, since redundant correction information is not recorded even if there are multiple lens IDs due to differences in firmware, situations in which the maximum number of lenses cannot actually be recorded are eliminated, and the user does not particularly need to be concerned about the above-described problem related to the maximum number of lenses that can be recorded.

The control unit 401 repeats the operations described above for all of the lenses apparatuses that are to be registered (S1106). After step S1106, the control unit 401 records the optical characteristics correction data that is to be registered using the data structure described with reference to FIG. 10, and transmits the optical characteristics correction data to the image pickup apparatus 301 (specifically, this processing is similar to the processing of step S404, and differs only with respect to the optical characteristics correction data that is transmitted). At this time, the control unit 401 references the registered optical characteristics correction data obtained from the image pickup apparatus 301 in step S401 and step S402, and checks whether there are any redundancies with the optical characteristics correction data that is to be registered. If a redundancy is found in this check, the control unit 401 may transmit, to the image pickup apparatus 301, only reference destination information for referencing the redundant optical characteristics correction data by the different lens IDs. In other words, the control unit 401 may transmit only reference destination information for optical characteristics correction data that is already registered in the image pickup apparatus 301. Doing this enables optical characteristics correction data that is already registered in the image pickup apparatus 301 to also be referenced by different lens IDs. Note that a description of processing other than the processing described above has been omitted due to being the same as in the first embodiment.

Note that the description in the above embodiments is merely exemplary, and the present invention is not limited thereto. Appropriate changes can be made to the configurations and operations in the embodiments described above.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-200079, filed on Aug. 1, 2008, and 2008-235734, filed on Sep. 12, 2008, which are hereby incorporated by reference herein in their entirety.

What is claimed is:

1. An information registration apparatus including a registration portion which is configured to register optical correction information of a lens apparatus in an image pickup apparatus by connecting to and communicating with the image pickup apparatus, comprising:
    an acquire unit that is configured to acquire, from the image pickup apparatus, identification information that is set in a lens apparatus that is attached to the image pickup apparatus; and
    a display control unit that is configured to control displaying a list of models of lens apparatuses to select a model of lens apparatus for transmitting optical correction information to the image pickup apparatus, such that the model of the lens apparatus corresponding to the identification information, which is acquired by the acquire unit and which corresponds to the lens apparatus that is attached to the image pickup apparatus, can be distinguished from the model of another lens apparatus.

2. The information registration apparatus according to claim 1,
    wherein the display control unit is further configured to display a confirmation window in which the model of the lens apparatus corresponding to the identification information acquired by the acquire unit has been designated as the model of the lens apparatus whose optical correction information is to be registered in the image pickup apparatus.

3. The information registration apparatus according to claim 1, further comprising,
    an operation unit that is configured to be able to receive a designation of the model of a lens apparatus that differs from the model of the lens apparatus that is attached to the image pickup apparatus.

4. The information registration apparatus according to claim 1,
    wherein the display control unit which is configured to display a display such that the model of the lens apparatus whose optical correction information is stored in an optical correction information storage unit can be distinguished from the model of another lens apparatus.

5. The information registration apparatus according to claim 1,
    wherein the display control unit is further configured to display a confirmation window in which a model of a lens apparatus that is attached after an exchange of the originally attached lens apparatus has been selected as the designated lens apparatus.

6. The information registration apparatus according to claim 1,
    wherein if the model of the lens apparatus that was attached before an exchange thereof was designated, the display control unit is configured to display a model of a lens apparatus that is attached after the exchange such that it is selected in addition to the model of the lens apparatus that was attached before the exchange.

7. The information registration apparatus according to claim 3, further comprising,
    a transmission unit that is configured to transmit registration information that includes, among optical correction information pieces of the lens apparatuses whose designation was received by the operation unit, only optical correction information pieces used by the image pickup apparatus.

8. A control method for an information registration apparatus including a registration portion which is configured to register optical correction information of a lens apparatus in an image pickup apparatus by connecting to and communicating with the image pickup apparatus, comprising:
    acquiring by an acquire unit, from the image pickup apparatus, identification information that is set in a lens apparatus that is attached to the image pickup apparatus; and
    controlling to display, by a display control unit, a list of models of lens apparatuses to select a model of lens apparatus for transmitting optical correction information to the image pickup apparatus, such that the model of the lens apparatus corresponding to the identification information, which is acquired by the acquire unit and which corresponds to the lens apparatus that is attached to the image pickup apparatus, can be distinguished from the model of another lens apparatus.

9. The control method for the information registration apparatus according to claim 8,
wherein the display control unit displays a confirmation window in which the model of the lens apparatus corresponding to the identification information obtained by the obtaining unit has been designated as the model of the lens apparatus whose optical correction information is to be registered in the image pickup apparatus.

10. The control method for the information registration apparatus according to claim 8, further comprising,
receiving, by an operation unit, a designation of the model of a lens apparatus that differs from the model of the lens apparatus that is attached to the image pickup apparatus.

11. The control method for the information registration apparatus according to claim 8,
wherein the display control unit displays a display such that the model of the lens apparatus whose optical correction information is stored in the optical correction information storage unit can be distinguished from the model of another lens apparatus.

12. The control method for the information registration apparatus according to claim 8,
wherein the display control unit displays a confirmation window in which a model of a lens apparatus that is attached after an exchange of the originally attached lens apparatus has been selected as the designated lens apparatus.

13. The control method for the information registration apparatus according to claim 8,
wherein if the model of the lens apparatus that was attached before an exchange thereof was designated, the display control displays a model of a lens apparatus that is attached after the exchange such that it is selected in addition to the model of the lens apparatus that was attached before the exchange.

14. The control method for the information registration apparatus according to claim 10, further comprising,
transmitting registration information that includes, among optical correction information pieces of the lens apparatuses whose designation was received by the operation unit, only optical correction information pieces used by the image pickup apparatus.

* * * * *